Dec. 20, 1955 C. C. STEVENS 2,727,698
TOROIDAL COIL WINDING MACHINE
Filed March 28, 1952 3 Sheets-Sheet 3
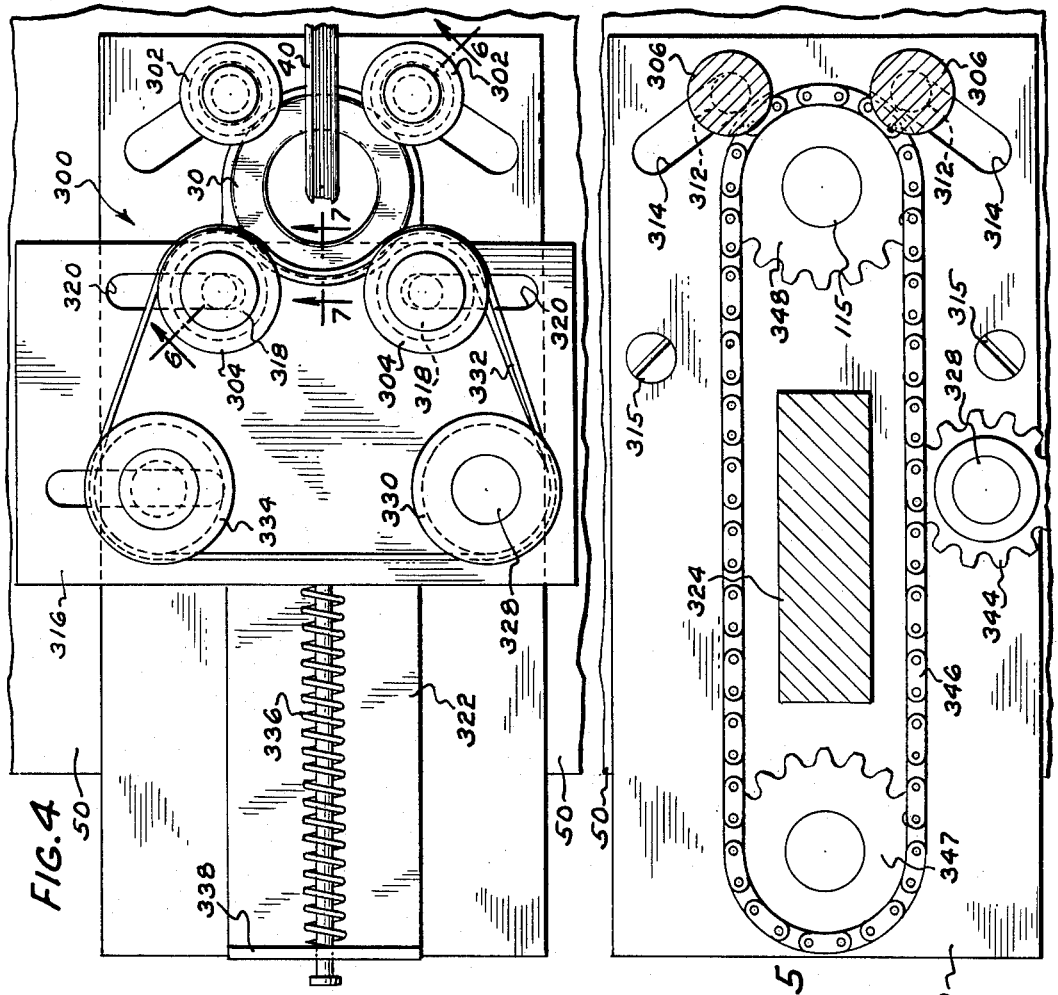
INVENTOR
C. C. STEVENS
BY [signature]
ATTORNEY United States Patent Office 2,727,698
Patented Dec. 20, 1955

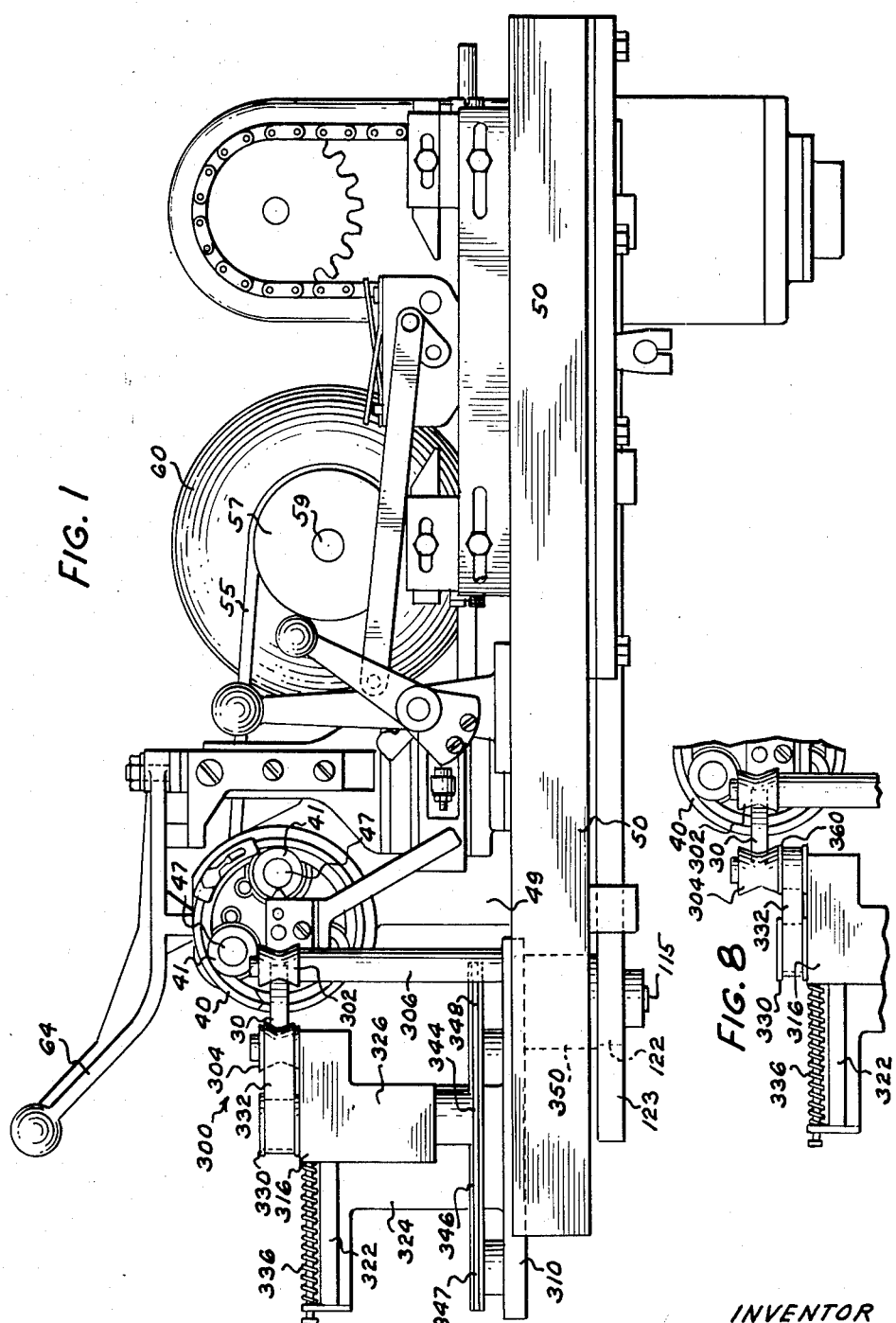

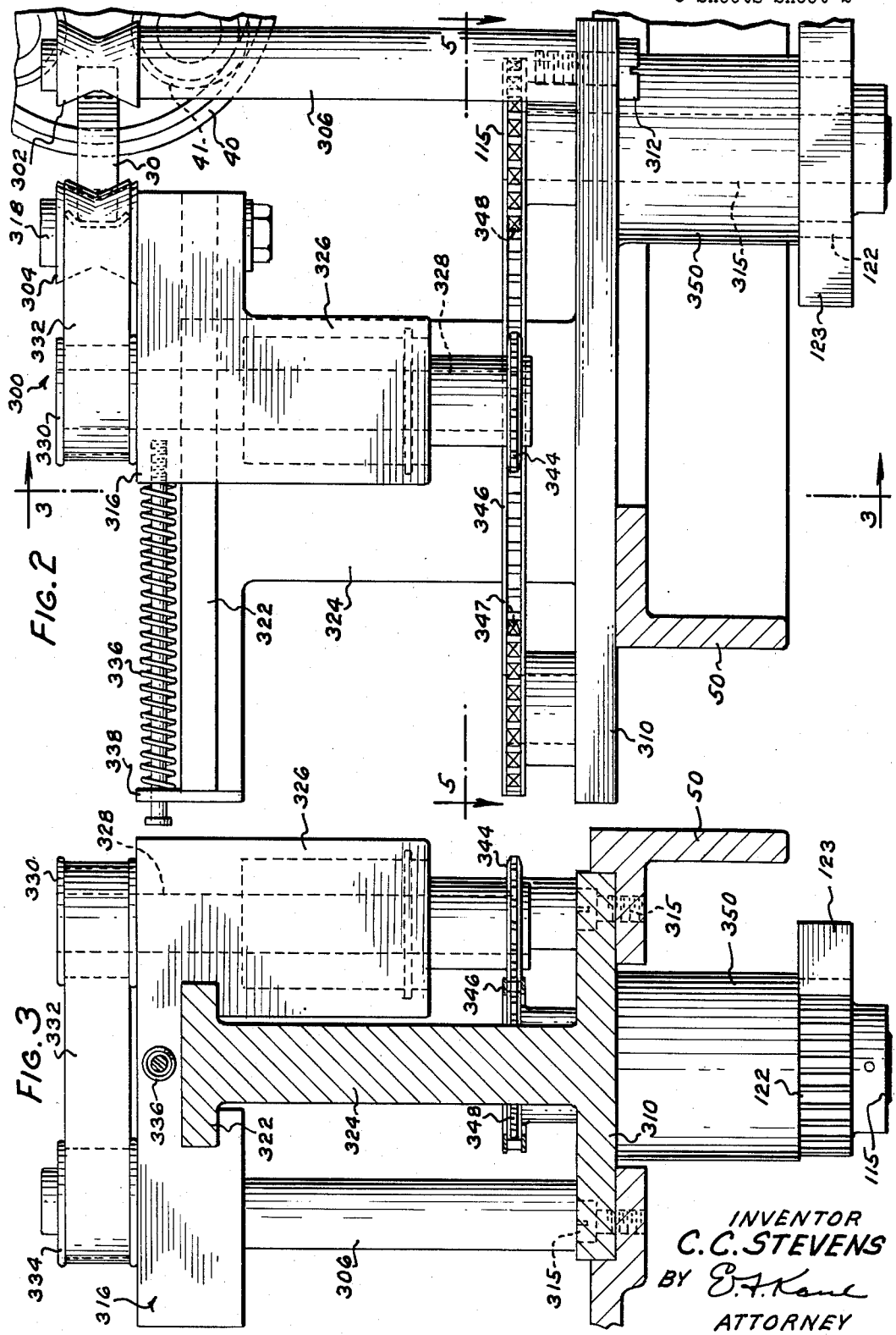

2,727,698

TOROIDAL COIL WINDING MACHINE

Clarence C. Stevens, Forestville, Conn., assignor, by mesne assignments, to Western Electric Company, Incorporated, New York, N. Y., a corporation of New York Application March 28, 1952, Serial No. 278,990

8 Claims. (Cl. 242—4)

This invention relates to a toroidal coil winding machine and more particularly to a mechanism for supporting and oscillating a toroidal core in a coil winding machine during the winding of the coil.

It is an object of the present invention to provide an improved mechanism for supporting and oscillating a toroidal core in a toroidal coil winding machine.

In accordance with one embodiment of the invention as applied to a toroidal coil winding machine having a rotatable shuttle, there is provided a first pair of stationary grooved rollers rotatable about fixed axes on opposite sides of the shuttle and a second pair of movable grooved rollers rotatably mounted on a slide for movement therewith toward and away from said stationary rollers and spring stressed towards said stationary rollers. An endless belt entrained about the movable rollers engages in the grooves thereof and forms a flexible channel shaped portion adapted to engage a substantial portion of the periphery of the toroidal core and the end faces thereof and in cooperation with the stationary rollers serves to support the core in winding position relative to the shuttle. Oscillation through any predetermined arcuate distance in timed relation to the rotation of the shuttle is imparted to the core by the endless belt which is driven from a drive pulley and shaft rotatably mounted on the slide for movement therewith and connected to a drive mechanism including a sprocket on the drive shaft and a chain having a portion engageable with the sprocket and movable through a straight path parallel to that of the slide to permit movement of the slide toward and away from the stationary rollers during the loading and unloading of the empty and the wound cores before and after the winding operation.

Other objects and advantages of the invention will become apparent by reference to the following description thereof and the accompanying drawings illustrating a preferred embodiment of the invention in which Fig. 1 is a side elevational view of a toroidal coil winding machine with the improved core supporting and driving mechanism thereon;

Fig. 2 is an enlarged elevational sectional view of the core supporting and driving mechanism;

Fig. 3 is a vertical sectional view taken on the line 3—3 of Fig. 2;

Fig. 4 is a plan view of the mechanism shown in Fig. 2;

Fig. 5 is a plan sectional view taken on the line 5—5 of Fig. 2;

Fig. 6 is a vertical sectional view taken along the line 6—6 of Fig. 4;

Fig. 7 is a sectional view through a portion of the core and belt taken on the line 7—7 of Fig. 4; and Fig. 8 is a fragmentary side elevational view of a modified embodiment of core supporting and driving mechanism.

Referring to the drawings (Figs. 1, 2, and 4), the toroidal core 30, about which a wire strand is to be wound, is supported in a holder 300 for oscillation about a vertical axis in winding position and in interlinked relation with a shuttle 40 of a toroidal coil winding machine. The shuttle 40 and the winding machine may be of any suitable type but preferably is of the type disclosed in Patent 2,656,124 to C. C. Stevens on a coil winding machine. The shuttle 40 which is of the split ring type is rotatably supported on three grooved rollers 41 which are secured to shafts 47 rotatably mounted in a bracket 49, which in turn is mounted on the base 50 of the winding machine. The shuttle 40 is rotated by a drive mechanism including a belt 55 and a pulley 57 mounted on a motor shaft 59 of a motor 60, which is mounted on the base 50.

The core holder 300 comprises a pair of fixed rollers 302 and a pair of movable rollers 304, which rollers are provided with V-shaped grooved peripheries adapted to receive the core 30 and support it for rotation and against vertical displacement. The rollers 302 are supported on the upper ends of posts 306 for rotation about the shanks of studs 308 threadedly secured to the posts. The posts 306 are secured to a plate 310 by headed screws 312 threaded into the lower end of the post and passing through slots 314 in the plate 310, which is secured to the base 50 by a plurality of cap screws 315. The slots 314 are disposed obliquely outwardly relative to each other to permit the posts 306 to be adjustably positioned on the plate 310 to support cores 30 of various sizes.

The movable rollers 304 are mounted on a slide member 316 for rotation about the shanks of studs 318 passing through slots 320 in the slide 316 and adjustably secured thereto. The slots 320 extend laterally of the slide 316 to permit the studs 318 and the rollers 304 to be adjustably secured in various positions on the slide to accommodate and support cores 30 of various sizes. The slide 316 has a T-shaped slot extending longitudinally on the underneath side thereof for receiving a guide rail 322, formed integral with the plate 310 and connected thereto by an upstanding web portion 324, for guiding the slide and the rollers 304 for movement toward and away from the stationary rollers 302.

The slide 316 is provided with a bearing portion 326 for rotatably supporting a shaft 328, which at its upper end has a pulley 330 fixed thereto. An endless belt 332 is entrained around the pulley 330, the rollers 304, and an idler or take-up pulley 334, which take-up pulley is adjustably mounted on the slide member 316. A compression spring 336, interposed between the slide 316 and a plate 338 fixed to the rail 322, stresses the slide 316 and the rollers 304 for movement toward the rollers 302 whereby a core 30 may be yieldably supported for rotation between the pair of fixed rollers 302 and a portion of the belt 332 between the movable rollers 304, and in winding and interlinked relation to the shuttle 40. Because of the V-shaped peripheries of the movable rollers 304 the portion of the belt between the rollers is formed into channel shape and engages a substantial portion of the periphery of the core and the end faces thereof and in cooperation with the outwardly flared surfaces of the grooved rollers 302 serve to support the core 30 for rotation about its axis and against axial displacement. The slide 316 and the rollers 304 will be forced rearwardly against the yieldable pressure of the spring 336 as the wire is wound on the core 30 and the diameter of the toroidal coil increases. The stationary rollers 302 and the movable rollers 304 may be adjusted to receive toroidal cores 30 of various sizes and support them for rotation about vertical axes and in winding and interlinked relation with the shuttle 40. When the movable rollers 304 are adjusted from one position to another on the slide 316 a corresponding adjustment of the take-up pulley 334 is made to maintain the belt 332 taut during the winding operation.

Any suitable drive may be provided for actuating the drive shaft 328 and the belt 332 to impart oscillation to the core 30 and also to permit movement of the slide 316 during the loading of empty cores into and the unloading of wound cores from the core holder 300, the drive shown herein being adapted to cooperate with the drive mechanism and the control therefor disclosed in detail in the above-referred-to application on a winding machine of C. C. Stevens. To the lower end of the shaft 328 is fixed a toothed wheel 344 in the form of a sprocket which meshes with a straight portion of an endless chain 346 supported for movement on a pair of sprockets 347 and 348 mounted for rotation about fixed axes on the plate 310. The sprockets 347 and 348 are arranged to provide a straight course or length of chain therebetween which is parallel to the movement of the slide 316 and is engaged by the sprocket 344 to effect a driving connection therewith while permitting movement of the sprocket 344 with the slide 316. The sprocket 348 which drives the chain 346 is mounted on a shaft 115 of the winding machine, the shaft 115 being rotatably supported in a bearing 350 formed on the plate 310. A gear 122 fixed to the lower end of the shaft 115 meshes with a rack bar 123 of the coil winding machine and is actuated in response to the controlled reciprocation of the rack bar to transmit movement to the belt 332 and impart oscillation to the core 30 through predetermined arcuate distances during the coil winding operation.

As more fully disclosed in the prior Stevens application, the rack bar 123 may be reciprocated through strokes of various lengths, the length of stroke being determined by the setting of control mechanism whereby the desired length of reciprocation of the rack bar 123 may be obtained to produce the desired oscillation of the toroidal core 30 through the predetermined arcuate distances. Thus, with the core supporting and drive mechanism disclosed in the drawings, particularly Figs. 2 and 4, the core may be oscillated through any arcuate distance, such as, for example, a portion of one revolution, a complete revolution, or more than a complete revolution.

In positioning a core in operative position in the winding machine, and with the shuttle 40 in the position as shown in Fig. 1, the lever 64 is actuated to open and laterally displace one end of the split ring shuttle after which the slide 316 and the rollers 304 thereon are moved away from the stationary rollers 302 to permit the placing of a core 30 over one end of the shuttle 40 and between the stationary rollers 302 and the movable rollers 304, after which the slide 316 is released, causing it to be urged toward the rollers 302 and effect the gripping engagement of the core 30 in the grooved portion of the rollers 302 and 304 and the portion of the belt 332 between the rollers 304, after which the lever 64 is returned to its normal position to close the shuttle. With the controls of the winding machine set to impart a predetermined reciprocation to the rack bar 123 to effect the oscillation of the core 30 through a predetermined arc, the motor 60 of the winding machine is started, causing the rotation of the shuttle 40 and the oscillation of the core 30 in timed relation thereto. On completion of the winding operation and with the shuttle 40 stopped in the position shown in Fig. 1, the lever 64 may again be actuated to open the shuttle, after which the slide 316 is moved away from the stationary rollers 302 to free the core 30 from the holder and permit it to be removed from the machine.

While in the preferred construction of core holder and drive illustrated in Figs. 2 and 4, the belt 332 which serves to rotate the rollers 304 is shown as engaging a portion of the core 30, it will be understood that the drive for the core 30 may be modified as shown in Fig. 8, so that the belt 332 will engage cylindrical portions 360 of the rollers 304 disposed axially at one side of the grooved peripheries thereof and that the core 30 may engage and be supported in winding position between the grooved surfaces of the rollers 302 and the rollers 304 and rotated by the rollers 304. The rollers 304 in such an embodiment may be made from or faced with a relatively resilient friction driving material.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a coil winding machine having a rotatable shuttle for winding strand onto a toroidal core, the combination therewith of a first pair and a second pair of rollers having grooved peripheries engageable with the periphery of the core, means mounting said rollers relative to each other to rotatably support a core between said first and said second pairs of rollers in winding position relative to said shuttle and for movement of one of said pairs of rollers to and from the other pair of rollers, resilient means for urging said pair of movable rollers toward said other pair of rollers to yieldably retain said core in winding position and to accommodate the increase in size of the coil as it is being wound, and drive means for imparting oscillation to one of said pairs of rollers, said drive means including a belt engageable with portions of said driven rollers in the grooves therein to form a flexible channel shaped portion for engaging a peripheral portion of said core and portions of the end faces thereof.

2. A coil winding machine comprising a rotatable shuttle for winding strand onto a toroidal core, means for rotating said shuttle, a first pair and a second pair of rollers having grooved peripheries engageable with the periphery of the core, means mounting said rollers relative to each other to rotatably support a core between said first and said second pair of rollers in winding position relative to said shuttle and for movement of one of said pairs of said rollers to and from the other pair of rollers, resilient means urging said pair of movable rollers toward said other pair of rollers to yieldably retain said core in winding position and to accommodate the increase in size of the coil as it is being wound, a flexible belt engageable with portions of said pair of driven rollers in the grooves therein to form a flexible channel shaped portion for engaging a peripheral portion of said core and portions of the end faces thereof, and drive means operable in timed relation to the rotation of said shuttle for imparting movement to said belt to effect the oscillation of said core.

3. In a coil winding machine having a rotatable shuttle for winding strand onto a toroidal core, the combination therewith of a first pair of rollers having grooved peripheries engageable with said core, means mounting said pair of rollers for rotation about fixed axes on opposite sides of said shuttle, a second pair of rollers having grooved peripheries engageable with said core, supporting means rotatably mounting said second pair of rollers in a predetermined relation to each other and the first pair of rollers and for movement toward and away from said first pair of rollers to rotatably support a toroidal core in winding position relative to said shuttle, an endless belt encircling portions of said second pair of rollers and engageable in the grooves thereof to form a channel shaped portion adapted to engage a portion of the periphery and end faces of said core, and means for driving said belt to effect the oscillation of said core.

4. A coil winding machine comprising a rotatable shuttle for winding strand onto a toroidal core, drive means for rotating said shuttle, a first pair of rollers having grooved peripheries, means mounting said pair of rollers for rotation about fixed axes in laterally spaced relation to each other, a supporting member, means mounting said supporting member for movement toward and away from said rollers, a pair of movable rollers having grooved peripheries rotatably mounted on said supporting member for movement therewith toward and away from said first pair of rollers, a belt entrained around the movable rollers and in the grooves therein to form a portion of the belt into channel shape adapted to engage portions of the periphery and end faces of the core, a drive pulley mounted on said supporting member for imparting movement to said belt, means urging said supporting member and said movable rollers for movement toward said first pair of rollers, said rollers and the channel shaped portion of said belt being arranged to yieldably support a toroidal core for rotation in winding position relative to said shuttle, and drive means operable in timed relation with the rotation of said shuttle for driving said pulley to effect the oscillation of a core supported by said rollers and said belt.

5. A toroidal coil winding machine comprising a shuttle, means for rotating said shuttle, a first pair of rollers having grooved peripheries engageable with said core, means mounting said rollers for rotation about fixed axes in predetermined relation to each other and said shuttle, a slide, means for supporting said slide for movement through a predetermined path toward and away from said first pair of rollers, a second pair of rollers having grooved peripheries engageable with said core rotatably mounted on said slide for movement therewith toward and away from said first pair of rollers, a shaft having a driving pulley thereon mounted for rotation on said slide member, a belt entrained around said driving pulley and said second pair of rollers for imparting rotation to said rollers in response to rotation of said shaft, means urging said slide member and said movable rollers for movement toward said first pair of rollers whereby a core may be supported in the grooved portion of said first and said second pair of rollers in winding position relative to said shuttle, a toothed wheel fixed to said shaft, and drive means including a reciprocable element engageable with said toothed wheel and operable in timed relation to the rotation of said shuttle for imparting oscillation to said toothed wheel to effect the oscillation of said core.

6. In a coil winding machine having a shuttle for winding strand onto a toroidal core, the combination therewith of a first pair of rollers having grooved peripheries engageable with the periphery of said core, means for supporting said pair of rollers for rotation about fixed parallel axes on opposite sides of said shuttle, a slide, a second pair of rollers having grooved peripheries rotatably mounted on said slide for movement therewith, means mounting said slide for movement through a predetermined straight path for guiding said second pair of rollers toward and away from said first pair of rollers, a shaft on said slide having a pulley and a sprocket thereon, a belt entrained around the pulley and the pair of rollers on said slide, means stressing said slide for movement toward said first pair of rollers whereby a core may be supported between the grooved portions of said first and second pairs of rollers in winding position relative to said shuttle, a chain, means including a pair of sprockets supporting said chain for movement with a portion thereof engageable with said sprocket on said shaft and movable through a straight path parallel with the movement of said slide, and drive means for imparting movement to one of said pair of sprockets to effect the oscillation of said core.

7. In a coil winding machine having a shuttle for winding strand onto a toroidal core, the combination therewith of a first pair of rollers having grooved peripheries engageable with said core, means for supporting said pair of rollers for rotation on opposite sides of said shuttle, a slide, a second pair of rollers having grooved peripheries rotatably mounted on said slide for movement therewith, means mounting said slide and the rollers thereon for movement through a straight path toward and away from said first pair of rollers, a shaft on said slide having a pulley and a sprocket thereon, a belt entrained around the pulley and the pair of rollers on said slide and in engagement with the grooves in said rollers to form a portion of the belt into channel shape adapted to engage portions of the periphery and end faces of a core, means stressing said slide for movement toward said first pair of rollers whereby a core may be supported between the channel shaped portion of the belt and said first pairs of rollers in winding position relative to said shuttle, a chain, means supporting a portion of said chain for movement through a straight path parallel to the movement of said slide and said sprocket thereon and in engagement with said sprocket, and drive means for imparting movement to said chain to effect the oscillation of said core.

8. In a coil winding machine having a shuttle for winding strand onto a toroidal core, the combination therewith of a plurality of rollers having grooved peripheries, means for supporting said rollers for rotation about substantially parallel axes and for movement of at least one of said rollers toward and away from at least one of the other rollers, a belt entrained around a pair of said rollers including said movable roller in the grooves therein for engaging portions of the periphery of a core to be wound, said belt and some of the rollers cooperating to engage the outer periphery of the core for rotatably supporting it in winding position relative to the shuttle, resilient means for moving said movable roller toward at least one of said other rollers for retaining the belt and the rollers in engagement with the core to be wound, and means for actuating said belt to impart rotation to said core.

References Cited in the file of this patent

UNITED STATES PATENTS

| 1,679,804 | Bisel et al. | Aug. 7, 1928 |
| 1,879,882 | Pullets | Sept. 27, 1932 |
| 2,305,999 | Steinmayer | Dec. 22, 1942 |
| 2,657,865 | Bennert et al. | Nov. 3, 1953 |

FOREIGN PATENTS

| 50,858 | Germany | Feb. 17, 1890 |